United States Patent [19]

De Villiers

[11] Patent Number: 5,621,248
[45] Date of Patent: Apr. 15, 1997

[54] NATURAL ENERGY POWERED MOTOR STARTER UTILIZING A CAPACITOR CIRCUIT CHARGED BY A SOLAR PANEL

[75] Inventor: Ian L. De Villiers, Transvaal, South Africa

[73] Assignee: Divwatt (Proprietary) Limited, Randburg, South Africa

[21] Appl. No.: 352,275

[22] Filed: Dec. 9, 1994

[30] Foreign Application Priority Data

Dec. 10, 1993 [ZA] South Africa ..................... 93/9265

[51] Int. Cl.⁶ .................................................. F02N 11/08
[52] U.S. Cl. ........................................................ 290/30 R
[58] Field of Search ............................... 290/30 R, 30 A, 290/30 B; 323/299; 318/779

[56] References Cited

U.S. PATENT DOCUMENTS

| | | | |
|---|---|---|---|
| 2,193,624 | 3/1940 | Garvey | 521/43 |
| 2,867,761 | 1/1959 | Hartmann, Jr. | 318/812 |
| 3,696,286 | 10/1972 | Ule | 323/15 |
| 4,100,427 | 7/1978 | Durand et al. | 307/87 |
| 4,468,569 | 8/1984 | Norris | 290/1 R |
| 4,483,319 | 11/1984 | Dinh | 126/646 |
| 4,614,879 | 9/1986 | Ault | 307/130 |
| 4,644,256 | 2/1987 | Farias et al. | 323/299 |
| 4,879,498 | 11/1989 | Shinohara et al. | 318/254 |
| 4,916,382 | 4/1990 | Kent | 323/299 |
| 4,970,451 | 11/1990 | Suomalainen | 323/222 |
| 4,999,560 | 3/1991 | Morishima et al. | 318/779 |

Primary Examiner—Steven L. Stephan
Assistant Examiner—Christopher Cuneo
Attorney, Agent, or Firm—Jones, Tullar & Cooper, P.C.

[57] ABSTRACT

A starter for a natural energy powered motor comprises, an electricity storage means connectable to be charged with electrical energy from a natural energy source, a voltage conversion means are provided to step up the charging voltage to the electricity storage means. An energy level sensor means is connected to the electricity storage means to sense a predetermined maximum charging level and to thereupon in use trigger discharge from the storage means of sufficient electrical energy to start to motor to be driven by electricity from the natural energy source in use.

19 Claims, 1 Drawing Sheet

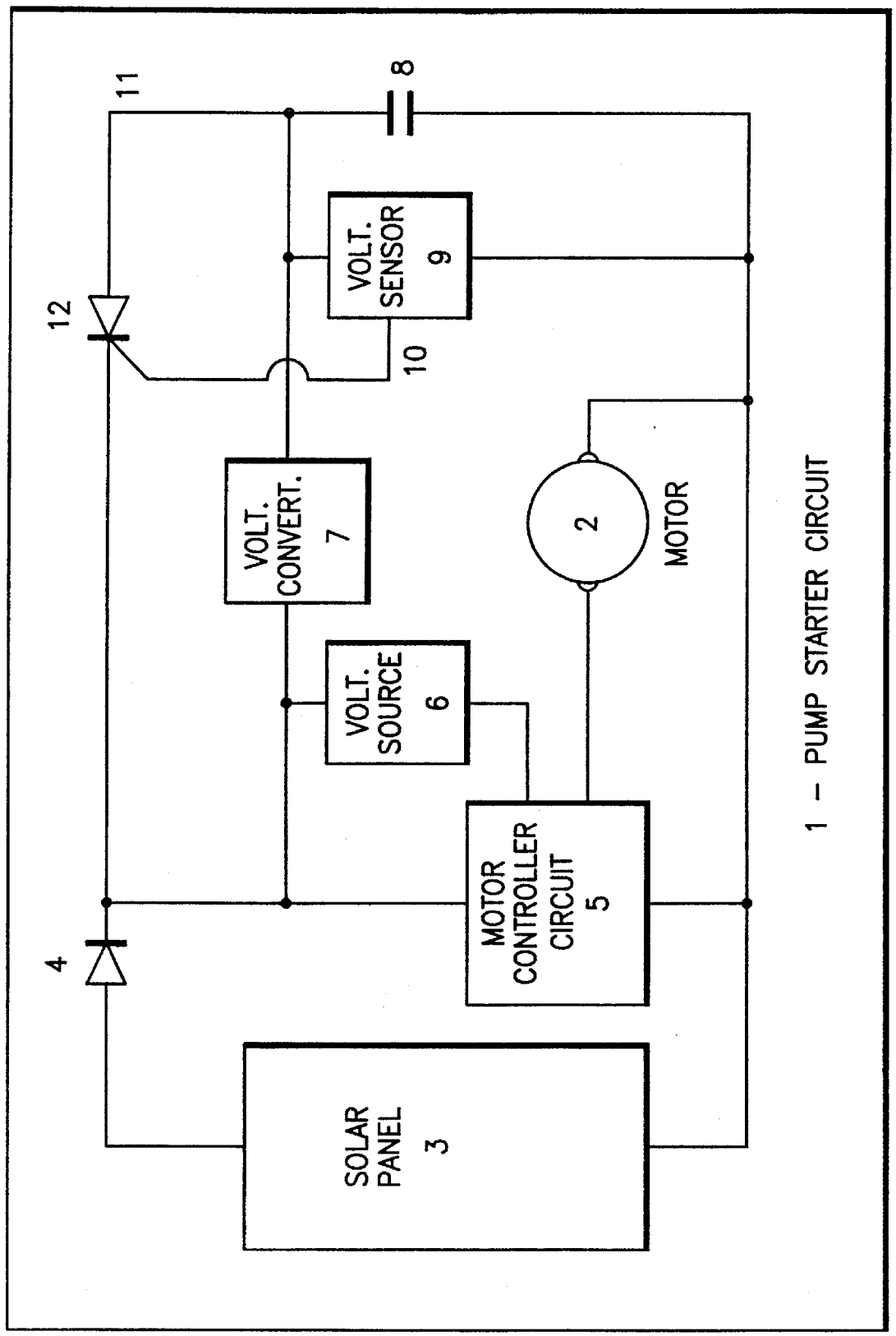

NATURAL ENERGY POWERED MOTOR STARTER UTILIZING A CAPACITOR CIRCUIT CHARGED BY A SOLAR PANEL

BACKGROUND TO THE INVENTION

This invention relates to a starter for a natural energy powered motor.

Natural energy sources are increasingly being tapped to produce electrical energy. Examples of this are photovoltaic or solar panels, and wind operated generators.

These natural energy sources are not constant, and while sufficient electrical energy may be present to drive a motor, the energy may be insufficient to start the motor.

One of the typical applications for solar powered motors is to drive pumps in remote areas where electrical supply and other power sources are not readily available.

Since the solar panels which are the normal source of solar energy provide a direct current (DC), a DC motor is used to drive such pumps. An inverter driven AC motor could alternatively be used.

The starting torque required to start the motor as well as overcome the mechanical inertia in the pump parts, can be significantly higher than the conventional steady state running current. This can cause start up on the pump in the morning to be delayed until sufficient sun energy is available to enable the panel at that time to provide the starting current for the motor, whereas the panel is quite capable of providing the ordinary steady state running current.

OBJECT OF THE INVENTION

It is an object of this invention to provide a starter for a natural energy powered motor, typically but not exclusively a motor used in a solar powered pump.

SUMMARY OF THE INVENTION

In accordance with this invention there is provided a starter for a natural energy powered motor, comprising an electricity storage means connectable to be charged with electrical energy from a natural energy source, voltage conversion means for stepping up the charging voltage to the electricity storage means, and an energy level sensor means connected to the electricity storage means to sense a predetermined maximum charging level and to thereupon in use trigger discharge from the storage means of sufficient electrical energy to start a motor to be driven by electricity from the natural energy source in use.

Preferably the natural energy source is a solar energy source and the storage means in a capacitor, and the level sensing means is preferably a voltage sensor connected to trigger a switch means which is preferably a silicon controlled rectifier (SCR), and preferably the SCR is connected to drive a motor controlling circuit.

Preferably the invention includes a unidirectional device such as a diode to prevent discharge from the storage means from passing into the natural energy source.

The invention extends to a natural energy pump arrangement comprising a natural energy source connected to drive a pump motor and to charge an electrical storage means, having a sensor means connected to sense the maximum charge level of electrical storage means, and to trigger a discharge device, the discharge device being arranged to allow discharge from the storage means to the pump motor.

BRIEF DESCRIPTION OF THE DRAWING

A preferred embodiment of the invention is described below by way of example only, and with reference to the accompanying drawing, which is a diagrammatic circuit of a solar powered pump arrangement including a starter in accordance with the invention.

DETAILED DESCRIPTION OF THE INVENTION WITH REFERENCE TO THE DRAWING

As illustrated, a pump apparatus (1) comprises a pump motor (2) connected to drive a pump (not shown), with the natural energy source being a solar panel (3). Such panels are well known in the art per se.

The output of the solar panel is connected through a diode (4) to drive a motor controller circuit (5) for controlling the output to the motor (2) to optimise the use of the available energy generated by the natural energy source in use (3).

The output from the solar panel (3) is taken to a smooth voltage source (6) which provides a constant voltage to the motor controller (5). A further output is taken through a voltage converter (7) to charge a capacitor (8) serving as an electrical energy storage device. The voltage converter (7) is provided to step up the voltage to the capacitor (8) to a level above that of the solar panel output (3). Located in parallel with the capacitor (8) is a voltage sensor (9), which is arranged to send a trigger signal along line (10) when the voltage over the capacitor (8) reaches a predetermined maximum. The capacitor discharges along a line (11) to a SCR, or other switching device (12), having its gate connected to the trigger output on line (10) from the voltage sensor (9). The voltage converter (7) is arranged to control the charging voltage to which the capacitor (8) can be charged.

In use, the solar panel (3) under ordinary running circumstances, provides a current through the diode (4) to the controller (5) to operate the motor (2) and consequently the pump.

However, in the early morning, or during inclement weather conditions, when there is insufficient solar energy to allow the solar panel (3) to start the motor (2) at, say, three amps (3A) starting current, the motor (2) will be unable to commence pumping until sufficient solar energy is available to provide this current. Given a nominal steady state drive current of 1,2 A this means that the solar panel (3) could be driving the motor (2) during this time, if only sufficient starting current were available.

This would apply to a wind generator or alternator where the wind velocity is not sufficiently high to supply the starting current requirements.

With this embodiment of the invention, the solar panel (3) charges the capacitor (8) through the voltage convertor (7) to a predeterminted maximum voltage that is sensed by the voltage sensor (9). On sensing this voltage, the SCR, or other switching device, (12) is triggered and the capacitor (8) discharges into the controller (5). This discharge is prevented from entering the solar panel (3) by the diode (4). This sudden increase in energy will enable the controller (5) to start the motor (2) and the motor (2) will continue running thereafter provided that the solar panel (3) is capable of providing the steady state running current.

It has been found in practice that the starter works to good effect.

What is claimed is:

1. A starter for a natural energy powered motor comprising:

a capacitor connectable to be charged with electrical energy from a natural energy source;

voltage conversion means for stepping up the charging voltage to the electricity storage means; and a voltage sensor connected to the capacitor to sense a predetermined maximum charging level and to thereupon trigger a silicon controlled rectifier to discharge from the capacitor sufficient electrical energy to start a motor to be driven by electricity from the natural energy source in use.

2. A starter as claimed in claim 1, in which the silicon controlled rectifier is connected to drive a motor controlling circuit.

3. A starter as claimed in claim 2, in which a voltage smoothing means in connected between the voltage conversion means and the motor controlling circuit, and is arranged to provide the motor controlling circuit with a substantially constant voltage in use.

4. A starter as claimed in claim 1, further including a unidirectional device connected to prevent discharge from the capacitor from passing into the natural energy source.

5. A starter as claimed in claim 4, in which the unidirectional device is a diode.

6. A starter as claimed in claim 1, in which the voltage conversion means is set to step up the voltage to the said predetermined maximum charging level.

7. A starter as claimed in claim 1, in which a natural energy source is connected to drive the electrical storage means.

8. A starter as claimed in claim 1, in which the natural energy source is a solar panel.

9. A starter circuit for an electric motor, comprising:

an electrical energy storage device connectable to be charged with electrical energy from a source having a variable output voltage;

a voltage converter connectable between the source output voltage and said storage device for stepping up the output voltage from the source to a voltage greater than that of said source and for supplying the stepped up voltage to said storage device;

a motor control circuit having an input, to said source output voltage and having an output connectable to an electric motor to be powered from the source;

a trigger circuit connected between said storage device and said motor control input; and a voltage sensor connected between said storage device and said trigger circuit to sense a predetermined voltage level in said storage device which is greater than said source output voltage and upon occurrence of said predetermined voltage level to activate said trigger circuit to supply voltage of said predetermined level to said motor control circuit for starting the motor.

10. The starter circuit of claim 9, wherein said source in a natural energy source.

11. The starter circuit of claim 10, further including a voltage smoother connected between the natural energy source output voltage and the motor control circuit to provide a substantially constant voltage to said motor.

12. The starter circuit of claim 11, wherein said voltage sensor is connected across said storage device to detect the voltage thereon.

13. A starter circuit for an electric motor comprising:

an electric motor;

a motor control circuit connected to said motor;

an energy source having a nonconstant output energy level;

a voltage smoothing circuit connected between said energy output and said motor control circuit to provide a constant first voltage to the motor control circuit for operating said motor;

a storage device;

a step-up voltage converter connected between said energy output and said storage device, said voltage converter supplying to said storage device a second voltage higher than the voltage of said energy source for charging said storage device;

a normally nonconductive switch connected between said storage device and said motor control circuit; and a sensor responsive to a voltage across said storage device sufficient to start said electric motor to trigger said switch to a conductive state to thereby connect said storage device to said motor control circuit to discharge said storage device and to thereby supply sufficient energy to said motor control circuit to start said motor.

14. A starter circuit for an electric motor, comprising:

an electrical energy storage device connectable to be charged from a source having a variable output voltage;

a voltage converter connectable between the source output voltage and the storage device for stepping up the output voltage from the source to a voltage greater than that of the source and for supplying the stepped up voltage to the storage device;

a trigger circuit connected between the storage device and an output connectable to a motor to be powered from the source; and a voltage sensor connected between the storage device and the trigger circuit to sense a predetermined voltage level in the storage device which is greater than the source output voltage and upon the occurrence of the predetermined voltage level to activate the trigger circuit to supply voltage of the predetermined level to the output connectable to a motor.

15. A starter as claimed in claim 14, in which the energy storage device is a capacitor.

16. The starter circuit of claim 14, wherein the source is a natural energy source.

17. The starter circuit of claim 16, wherein the natural energy source is a solar panel.

18. The starter circuit of claim 16, further including a voltage smoother connected between the natural energy source output voltage and the output connectable to the motor to provide a substantially constant voltage to the motor.

19. The starter circuit of claim 14, wherein a unidirectional device is connectable between the storage device and the source output to prevent discharge from the storage device from passing into the source.

* * * * *